United States Patent [19]

Matsuo et al.

[11] Patent Number: 5,156,033
[45] Date of Patent: Oct. 20, 1992

[54] METHOD OF CUTTING STEEL PRODUCTS IN A ROLLING LINE

[75] Inventors: Giichi Matsuo; Akio Mehara, both of Kanagawa; Tsuyoshi Nakano, Hyogo; Daizo Kobayashi, Hyogo; Motosuke Sugahara, Hyogo, all of Japan

[73] Assignees: NKK Corporation; TOA Steel Corporation, both of Tokyo, Japan

[21] Appl. No.: 759,470

[22] Filed: Sep. 13, 1991

Related U.S. Application Data

[63] Continuation-in-part of Ser. No. 257,312, Sep. 1, 1988, abandoned.

[51] Int. Cl.⁵ .................. B21B 37/00; B21B 11/00; B21B 1/00; B26D 7/14
[52] U.S. Cl. .......................... 72/14; 72/131; 72/203; 83/18; 83/287; 83/363; 140/140
[58] Field of Search .............. 72/128, 129, 131, 201, 72/203, 14, 132, 161, 331, 334, 337, 338; 83/69, 208, 210, 242, 369, 15, 18, 37, 268, 272, 277, 287, 288, 363; 140/139, 140, 147

[56] References Cited

U.S. PATENT DOCUMENTS

| | | | |
|---|---|---|---|
| 3,266,351 | 8/1966 | Kolodgy et al. | 72/203 |
| 3,538,726 | 11/1970 | Cook | 72/203 |
| 3,543,624 | 12/1970 | Richards | 83/288 |
| 3,756,059 | 9/1973 | Krafft et al. | 72/203 |
| 3,757,552 | 9/1973 | Ritter et al. | 72/12 |
| 3,841,180 | 10/1974 | Cütlbauer et al. | 83/15 |
| 4,610,281 | 9/1986 | Fuchs et al. | 140/140 |
| 4,872,330 | 10/1989 | Nonini | 72/203 |

FOREIGN PATENT DOCUMENTS

| | | | |
|---|---|---|---|
| 0067391 | 12/1982 | European Pat. Off. | 72/132 |
| 0050274 | 5/1976 | Japan | 140/140 |
| 0061494 | 4/1982 | Japan . | |
| 0181516 | 10/1983 | Japan . | |
| 0044306 | 2/1987 | Japan . | |
| 0044307 | 2/1987 | Japan . | |

Primary Examiner—Lowell A. Larson
Assistant Examiner—Thomas C. Schoeffler
Attorney, Agent, or Firm—Nields & Lemack

[57] ABSTRACT

A multiplicity of cooled steel products, after having been severed from an as-rolled steel, divided into sectional bars and delivered to and accumulated on a cooling hearth, are taken from the cooling hearth, and delivered to a multi-bar straightening machine. There, simultaneously with straightening, a predetermined distance from the leading ends of the bars is measured simultaneously, the forward movement of the bars is interrupted after they have advanced by said measured distance, and said forward portions are cut.

1 Claim, 6 Drawing Sheets

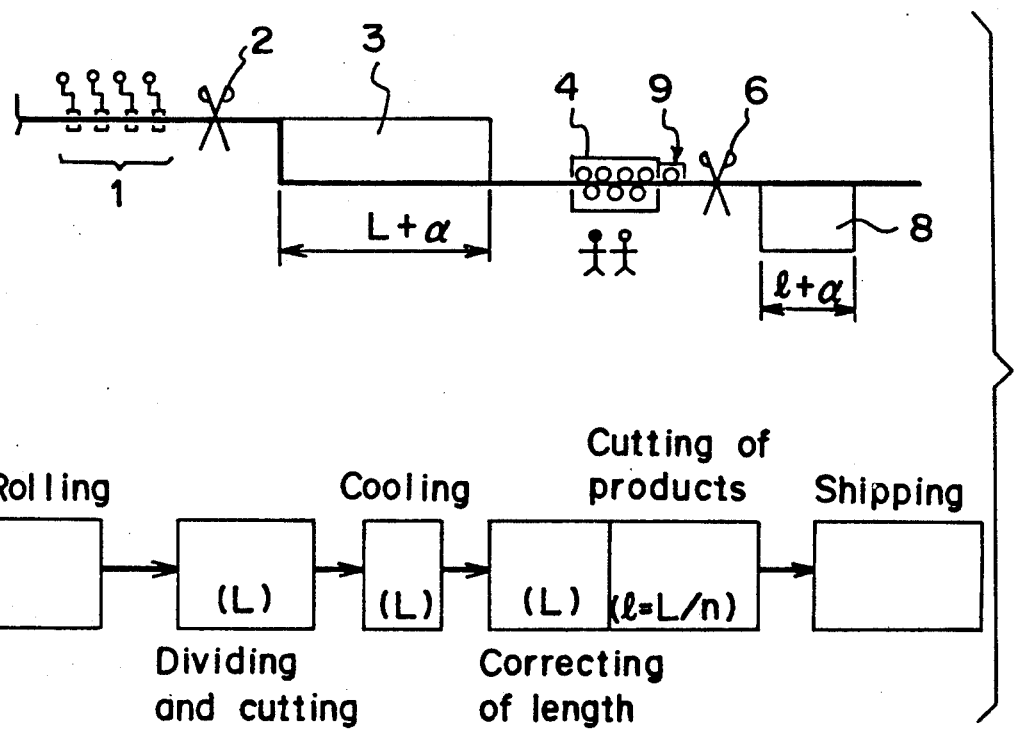
FIG_1
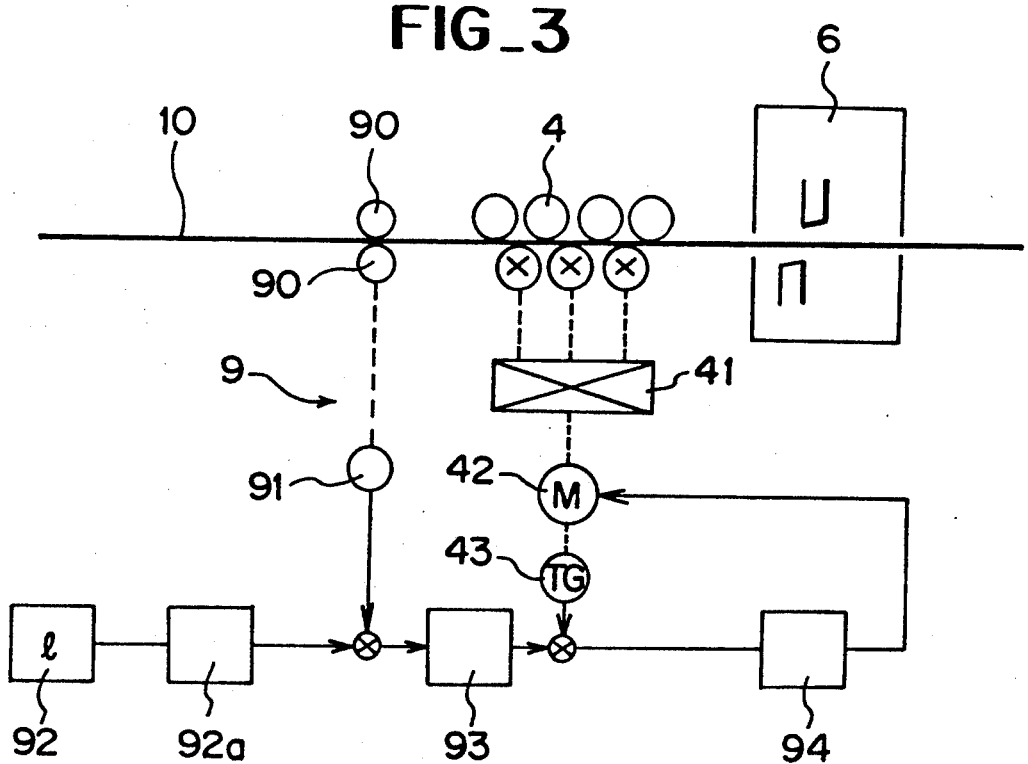
FIG_3

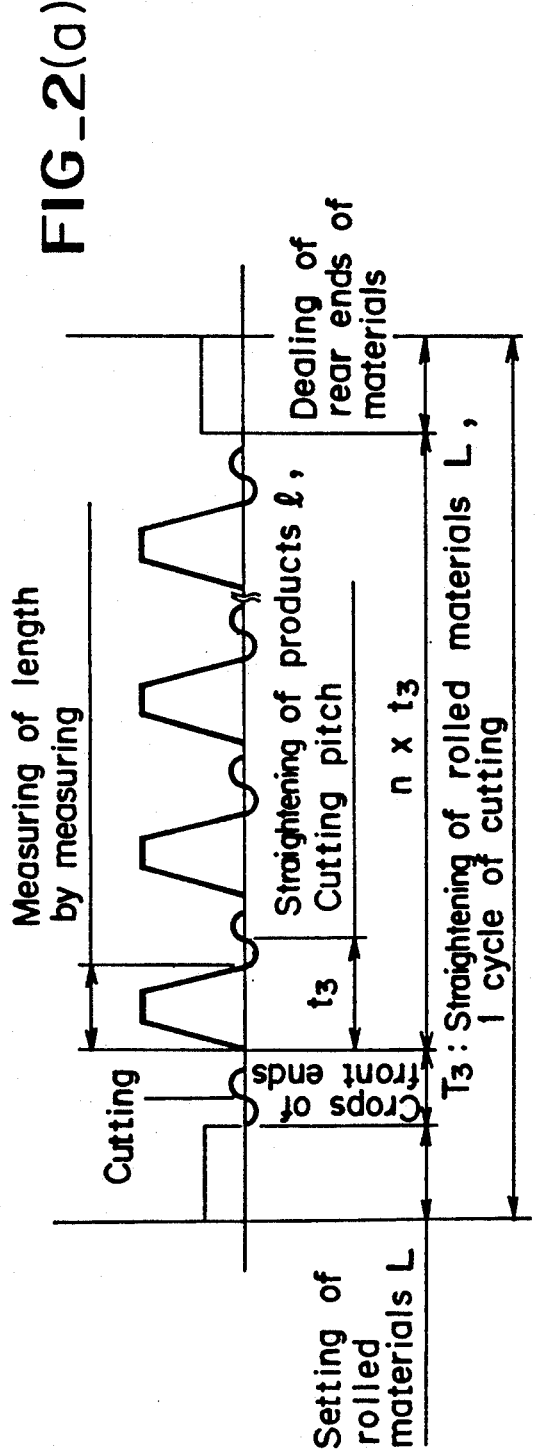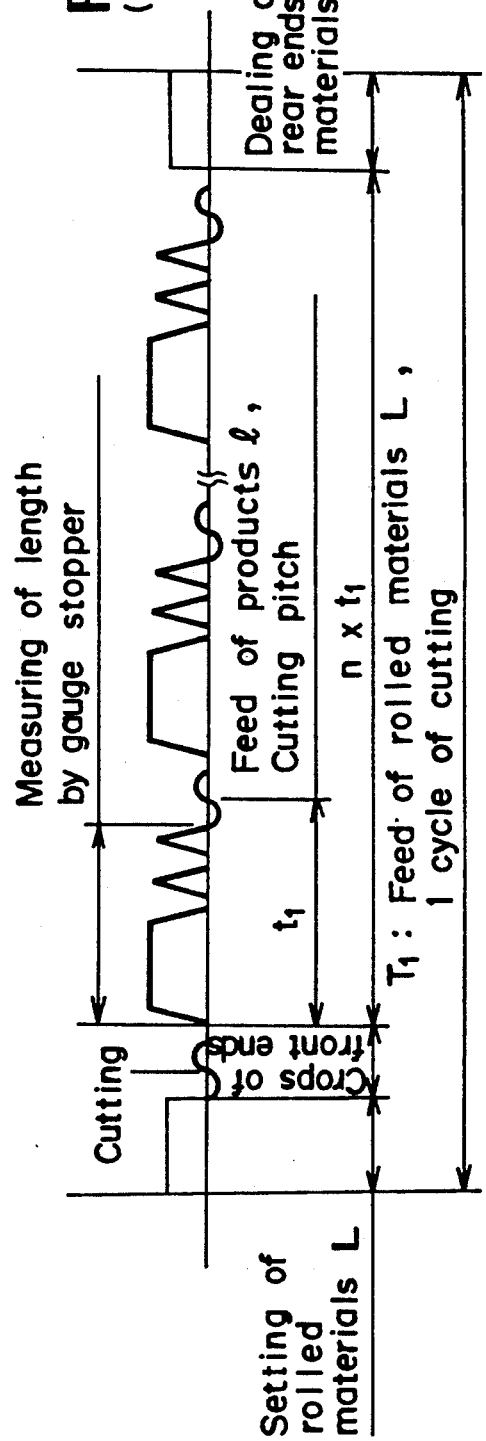

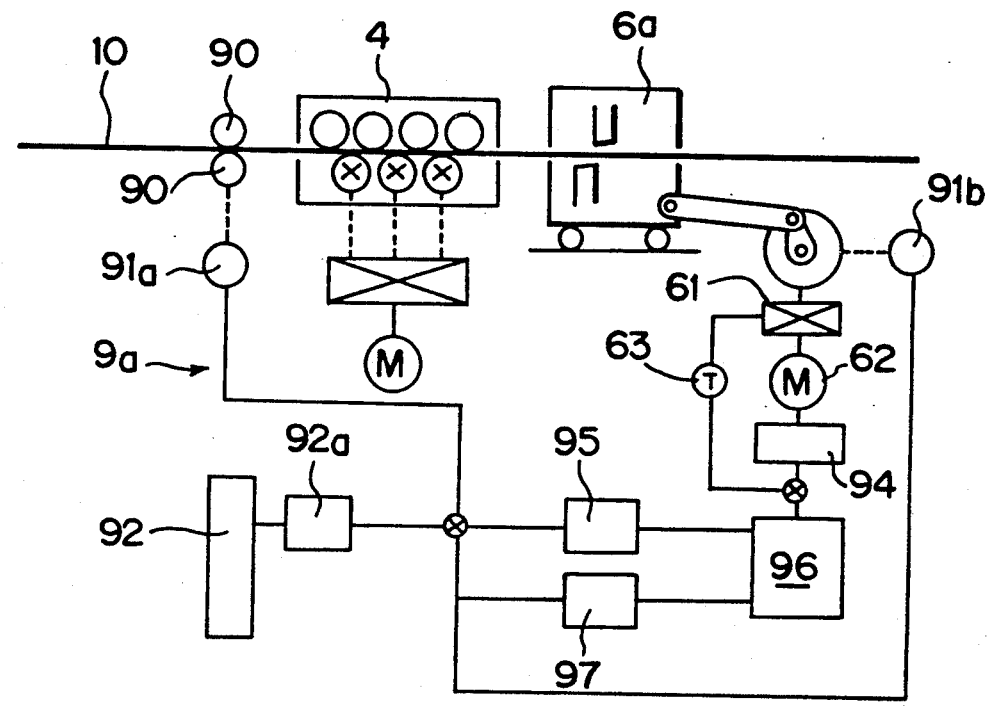
FIG_4
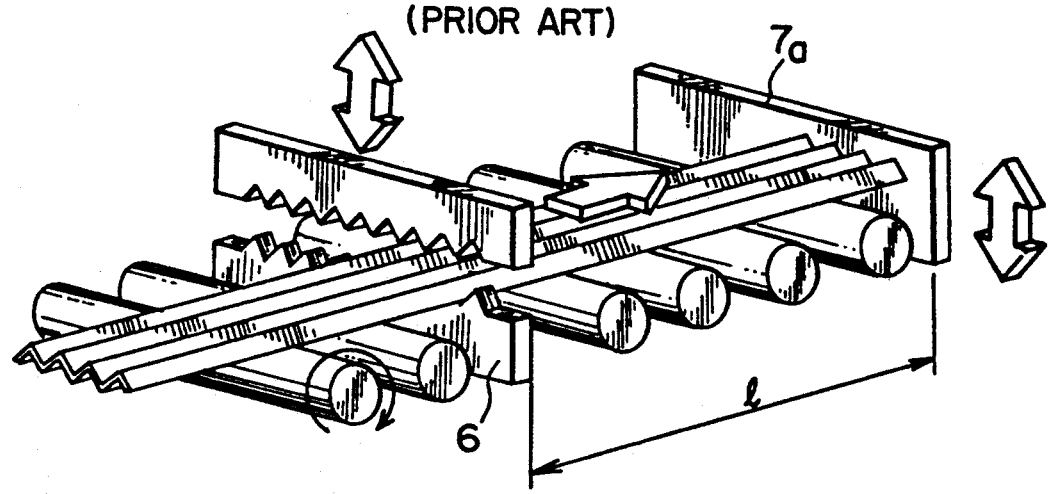
FIG_8
(PRIOR ART)

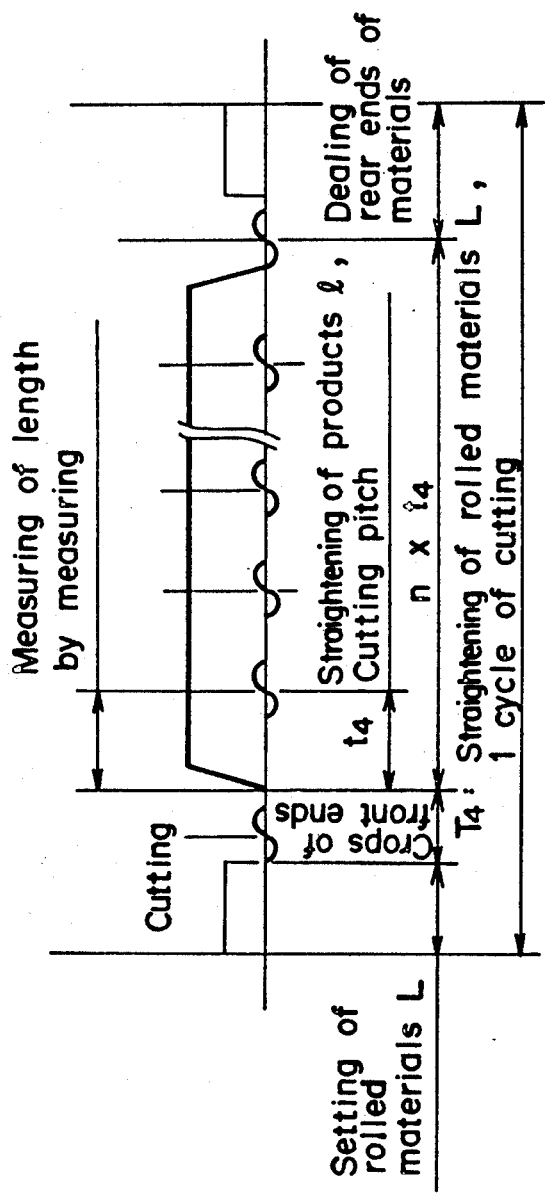
FIG_5(a)
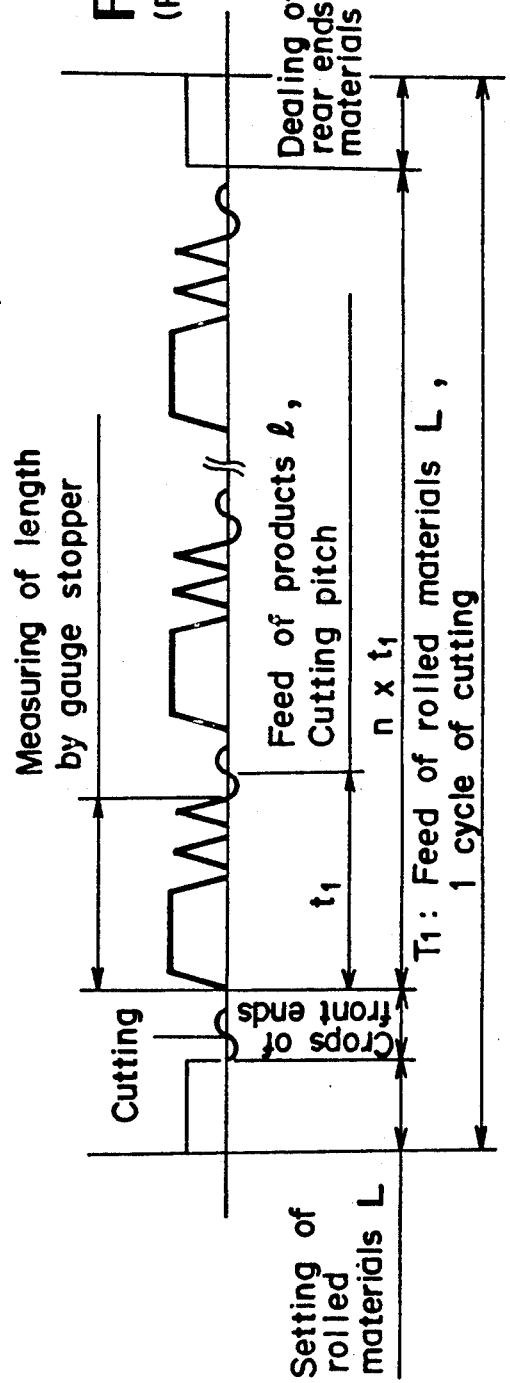
FIG_5(b) (PRIOR ART)

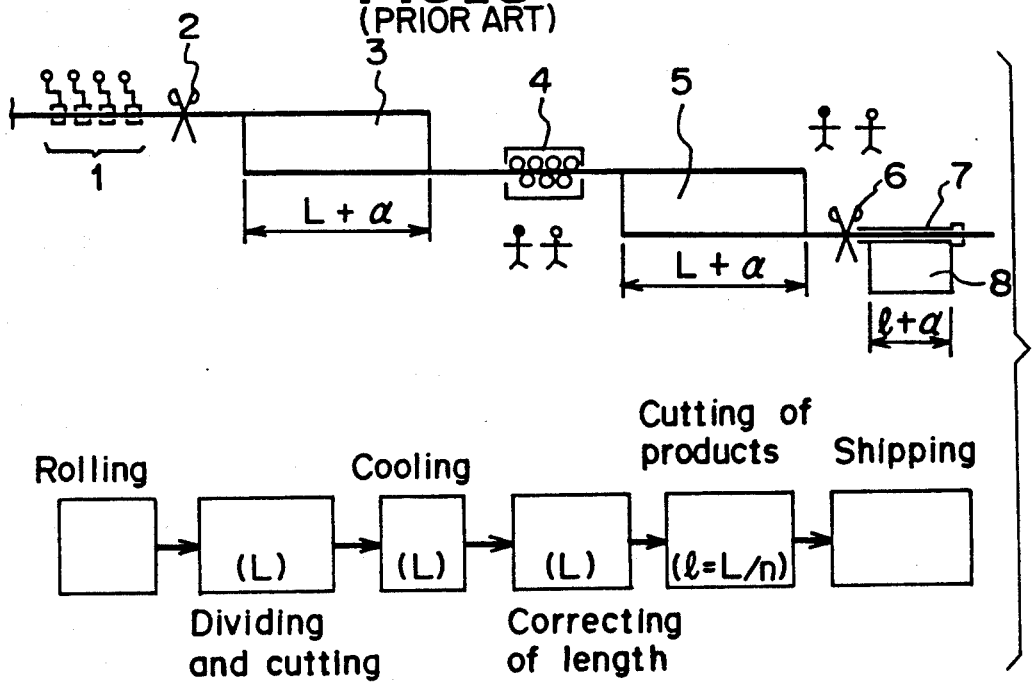
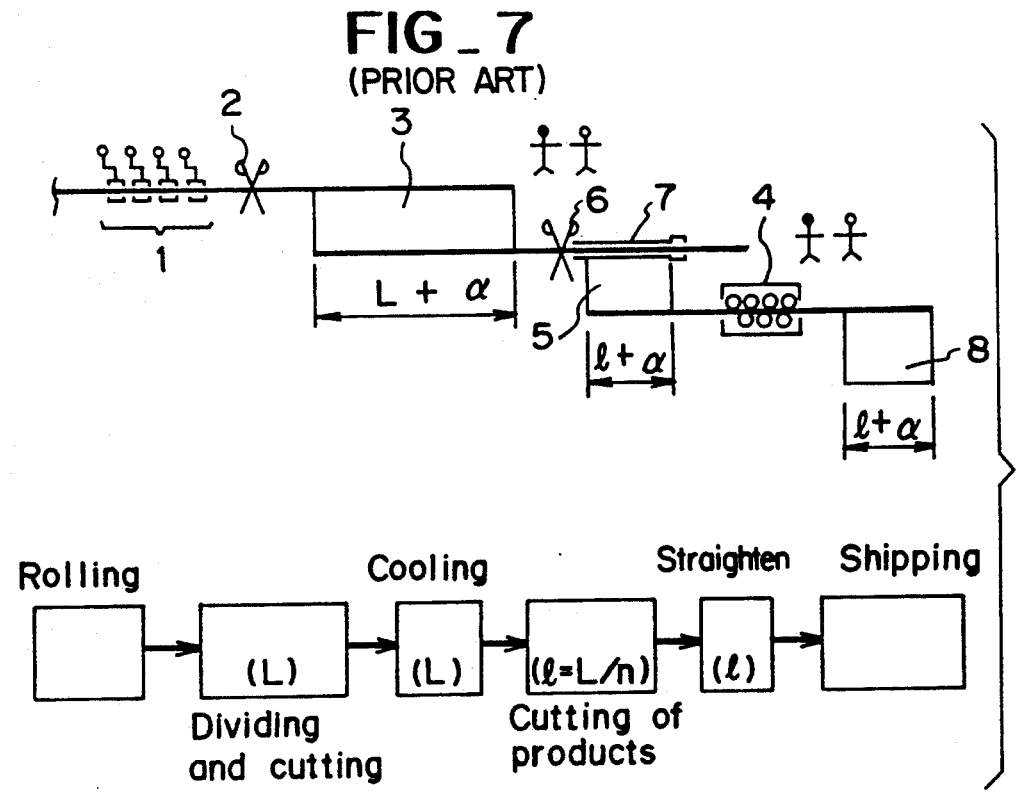

FIG_9(a)
(PRIOR ART)
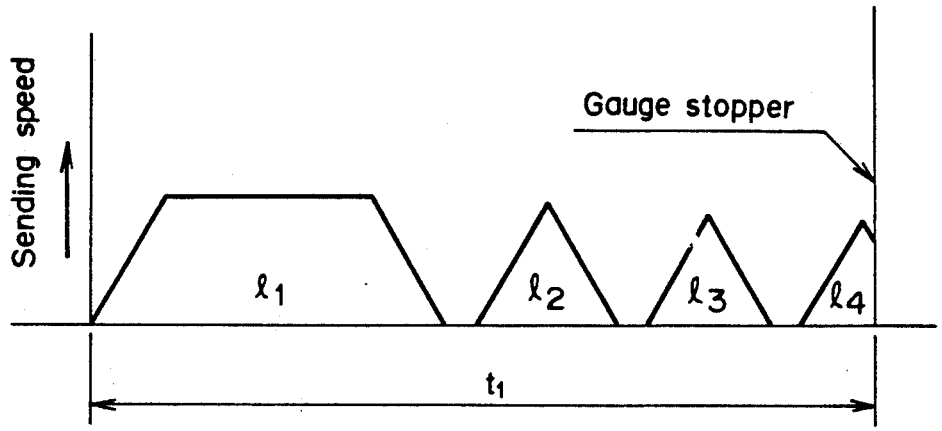
FIG_9(b)
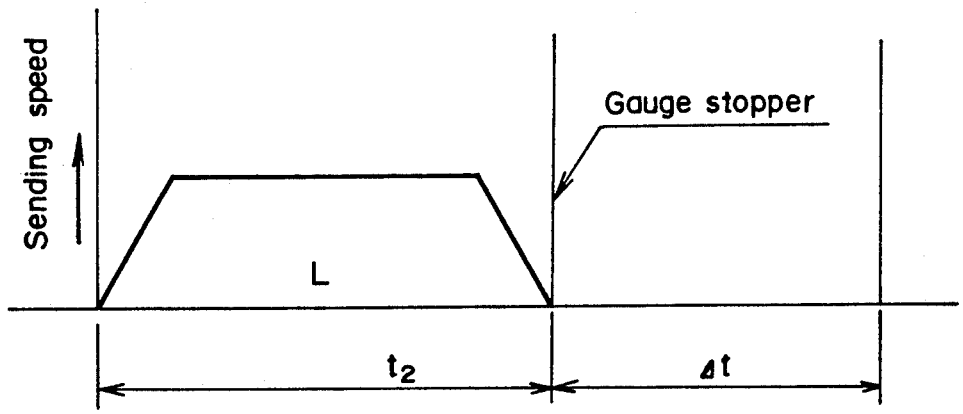
$$L = \ell_1 + \ell_2 + \ell_3 + \ell_4 \qquad t_1 > t_2$$

METHOD OF CUTTING STEEL PRODUCTS IN A ROLLING LINE

This application is a continuation-in-part of application Ser. No. 07/257,312, filed Sep. 1, 1988, now abandoned.

TECHNICAL FIELD

The present invention relates to a method of cutting cooled steel products such as angled, channeled or specially shaped steels in a rolling line while feeding them in-line on a straightener or feed roll.

BACKGROUND OF THE INVENTION

Steels rolled in a rolling shop generally grow in length from tens to hundreds of meters. The rolled steel product is cut to appropriate lengths and cooled for transferring to a subsequent cooling process. Some of the cooled and cut products are again cut and straightened on an off-line assembly, but in modern rolling factories, after having been cooled, most of the products are straightened on a following in-line assembly, and are cut to required lengths.

FIGS. 6 and 7 show conventional procedures most ordinarily used, where the product from a rolling mill 1 is cut to appropriate lengths by a dividing shear 2 and is cooled by a cooling hearth 3. In the process shown in FIG. 6, a product having the length of the cooling hearth 3 is straightened by a straightener 4, and is cut by a cutter 6 to required lengths. In the process shown in FIG. 7, after having been cut by the cutter 6, the product is straightened by the straightener 4. In each of FIGS. 6 and 7 the straightener 4 and the cutter 6 are "off-line".

In either procedure, there is provided, without exception, a delay table 5 for once pooling or stopping the product between the straightener 4 and the cutting machine 6. A large space is required for installing the delay tables, and since they are positioned separate from the rest of the apparatus, they hinder operations and the saving of energy. Moreover, taking into consideration problems involved with the existing practices from the point of view of capacity, the rolling capacity must in principle match the capacity of installations after (i.e. downstream of) the cooling hearth. However, the rolling speed is 10 m/sec or more, but the straightening speed is 3 to 4 m/sec at the most, and the feeding speed in the cutting process is in general 2 m/sec. For solving imbalance in capacity the straightening and the cutting have utilized multi-treatments where a plurality of products are dealt with concurrently.

On the other hand, in cutting a plurality of bars, it is generally practised that these bars are made to collide with a gauge stopper 7a before cutting as shown in FIG. 8, so that the products which would be fed at random on the roller are set within cutting tolerance. FIG. 9(a) shows the speed pattern used for avoiding large shocks. In the speed pattern of FIG. 9(a) the products to be cut are made to slow down or stop before striking the stopper; they are fed bit by bit and are caused to strike moderately against the stopper several times, and thereafter they are cut. A cutting cycle (t1 sec) in this case is longer by $(t_1 - t_2)$ sec in comparison with a cutting cycle (t2 sec) when the products are sent by the theoretical speed pattern of FIG. 9(b). In general, calculation of cutting ability is expressed by the following equation $$Q = 3600/(nt + t3) \times w \times n \times l \times N \times 10^{-3} (T/H)$$

Herein;
- w: Weight per unit length (Kg/m) of a single steel product
- l: Cut length (m)
- N: Number of pieces which are simultaneously cut
- n: Number of times cut
- t: Cycle time (sec) of cutting into lengths l, corresponding to t1 and t2 of FIGS. 9(a) and (b)
- t3: Time required to set the products before cutting, and time required to deal with scraps after cutting.

If t1 and t2 of FIGS. 9(a) and (b) are substituted into "t" of the above equation and their abilities are compared, the ability by the actual speed pattern is apparently delayed as compared with that of the theoretical speed pattern. This delayed degree depends upon factors of the cutting times (n), the cutting length (l) and others. If the degree is calculated by trial with l=5 to 6 m which is highest in production ratio, the degree is around 60 to 70%, and the ability is not heightened, notwithstanding the multi-bars cutting, and this practice often hinders productivity of the steel bar rolling line.

The present invention has been developed to solve the above mentioned problems, whereby the lay-out of the operation in the rolling line is changed completely by abolishing the step of evening up the leading ends of the products (or rods or bars) to be cut. When a plurality of products are treated in this way the productivity of the multirod rolling line is heightened.

DISCLOSURE OF THE INVENTION

FIG. 1 is a view for explaining the inventive process in substitution of the above mentioned conventional practice. An installing lay-out of the rolling mill 1, a dividing shear 2 and a cooling hearth 3 is the same as the prior art, but the present invention does not employ the delay table. A straightening machine 4 is positioned at the upstream side of the cutting machine 6 which is provided at the downstream side of the cooling hearth 3.

It is a fundamental characteristic of this invention to straighten multi cooled products by the straightener 4 at the same time as measuring the length of the products, and cut them in a required length by means of the cutter 6 in one lot.

A feed roll may be installed instead of or in parallel with the straightener 4, and in that case the products are measured and cut while they are being fed on the feed roll. The above operation may also employ an installing lay-out in which the straightener 4 and/or the feed roll are placed at the downstream vicinity of the cutter 6.

Further, it is sufficient to measure the length of the product by means of a measuring apparatus 9 disposed before the cutter 6 as shown in FIGS. 3 and 4.

As mentioned above, the present invention straightens the products (and/or feeding by a pinch roller) and simultaneously cuts them into product length. Since this invention no longer requires contacting of the products to the gauge stopper for regulating the leading ends thereof, the straightening and cutting may be carried out smoothly. The invention has an excellent effect that a big contribution may be made to heightening of the productivity of the steel rolling line. Further, the two steps of straightening and cutting comprise one step to reduce accompanied facilities, so that it is possible to reduce the space required for installation of the rolling line, curtail the number of workers and avoid accidents.

For installation planning, the small installation space may give flexibility to the planning, and largely cost down investments including charges for land, buildings, machinery and basic construction, and further it provides savings in running cost.

BRIEF DESCRIPTION OF THE DRAWINGS

FIG. 1 is a view for explaining the inventive process;

FIG. 2(a)(b) are views for explaining speed patterns of straightening and cutting by one example of the invention together with the pattern of the conventional practice;

FIG. 3 is a view showing a measuring apparatus to be used in the present embodiment;

FIG. 4 is a view showing a couple of the measuring apparatus and a travelling cutter in the other embodiment;

FIG. 5(a)(b) are views for explaining speed patterns of stretching and cutting by the other example of the invention together with the patterns of the conventional practice;

FIG. 6 is a view explaining the conventional straightening and cutting processes in the steel rolling line;

FIG. 7 is a view for explaining another example of the conventional straightening and cutting process in the same;

FIG. 8 is a perspective view showing the length measuring process by the gauge stopper; and FIG. 9(a)(b) are views showing the speed pattern and theoretical speed pattern in sending and cutting when the measuring is performed by the gauge stopper.

In the drawings, 1 is a rolling machine; 2 is a dividing shear; 3 is a cooling hearth; 4 is a straightener; 6, 6a are cutters; 8 is an adjusting facility; and 9, 9a are length measuring devices.

EMBODIMENT FOR PRACTISING THE INVENTION

The present inventive process will be explained in detail.

The steel rolling lines as shown in FIGS. 1 and 6 are employed. For example, aiming at 6 m of product length in each product, a plurality of rolled materials L of 114 m length including crop length at both ends were cooled and straightened and were cut by the cutter. The cutting pattern by the inventive process is shown in FIGS. 2(a)(b) together with the pattern of the conventional practice. In the present invention, the rolled materials L were placed on the straightener and the crop cutting at the ends of the materials were carried out, and the rolled and straightened materials L were measured in length by the length measuring device 9, and when the determined feed length was obtained, the materials were stopped and cut in a plural number in one lot. Cuttings of 19 times were repeated on the plurality of steel materials, and the treatments were made on the remaining ends thereof. On the other hand, the conventional practice stretched the materials and placed the rolled materials L sent from the transferring table. The crop cutting at the ends of the materials were done, and the end points were regulated by contacting to the gauge stopper for measuring the length, and were cut in the plural number. Similarly to the invention, the cuttings of 19 times were repeated and the treatments were made on the remaining ends thereof.

As the length measuring device 9, FIG. 3 shows one example (based on the premise of the facility lay-out of the preceding figures), and it is optimum to carry out the length measuring at high efficiency and high precision (almost equally to the case that the end points are conventionally contacted to the gauge stopper) by a length measuring device 90 and DC servo motor 42.

In the present embodiment, the length was measured by the device 9 as shown in FIG. 3. The structure thereof is as follows. In the facility layout which positions the straightener 4 (and/or feed roll) before the cutting machine 6, and straightener 4 (and/or feed roll) is connected to the DC servo motor 42 via a transmission mechanism 41, and a speed feed back signal is given to a speed controller 43 from a speed detecting tacho generator 43 connected to the motor 42. A pulse tacho 91 provided to the length measuring rollers 90 measures feed length by pulse number. When an operator sets the feed length 1 in a length setting device 92, "1" is preset in a pulse setting device 92a, and a digital-analog converter 93 issues speed order by a start designation, controls speed of a motor 42, feeds a cutting length and stops. Just after stopping, the cutter 6 cuts the steel materials.

Except that the product length is measured by the device 9 and the measuring is once stopped for cutting, aiming at largely shortening the cutting pitch and speed-up, it is possible to carry out the measuring length and continuous cutting during running by a length measuring device 9a and a running cutter 6a as shown in FIG. 4. The running cutter 6a is connected with a motor 62 via a transmission mechanism 61, and a speed feed back signal is given to a speed controller 94 for the motor 62 from a speed detecting tacho electric generator 63 connected with the transmission mechanism 61. A register 97 is always written in with the pulse number for measuring the running distance from a pulse tacho 91a provided to the rollers 90 and the pulse number for counting the moving distance of the cutter 6a from a pulse tacho 91b provided to the running cutter 6a. A pulse L is converted by a reference pulse setting device 92a in accordance with the cutting length determined by a length setting device 92, and when the pulse L is given a signal notifying completion of cutting from the cutter 6a, this pulse L is added to the register 95. At this time, the speed order is given to the speed controller 94 from a signal discriminator 96 and controls the motor 62 of the cutter 6a so that it is cutting as running via the transmission mechanism 61 and returns to.

Results of practising the present embodiment will be mentioned in comparison with the conventional system.

The present invention performs the cutting and the straightening concurrently, and omits the slow-down and the contactings of several times to regulate the head parts of the steel materials. Therefore, as seen in FIGS. 2(a), (b), the straightening of the products 1 and the cutting pitch t3 are smaller than the feeding of the product 1 and the cutting pitch t1 of the conventional system. Accordingly, the straightening of the rolled material L and 1 cycle T3 of the cutting are far smaller than the feeding of the rolled material L and 1 cycle T1 of the cutting of the conventional system. The cutting pattern agrees to a theoretical pattern of FIG. 9(b), and assuming that the feeding speed is equal to that of the conventional one, the cutting ability reaches 1.8 times of the prior art. The length is not measured by the gauge stopper, and the feeding speed (=straightening) therefor can be easily heightened 1.5 times to twice in comparison with the conventional one, so that the cutting ability reaches twice, and the balance between the rolling ability and the straightening-cutting ability may be kept.

Further, the 2 processes of the conventional straightening and cutting are a single process in the present invention. Since the accompanied facilities are reduced, disorders about the facilities are reduced accordingly, and the four workers conventionally needed may be reduced to only two people. In addition, the space required to positionings of the facilities may be largely reduced.

With respect to the other embodiment of the invention, the cooled and rolled materials are straightened and cut as running on the same line as said above by means of the length-measuring device 9a and the cutter 6a as shown in FIG. 4. FIGS. 5(a), (b) show the cutting patterns at that time by the invention and the conventional system. Since the invention continuously cuts the rolled materials L after cutting crops at the ends, while straightening and measuring them, the straightening of the products and the cutting pitch t4 are smaller than not only the sending and cutting pitch t1 of the conventional system but the straightening and cutting pitch t3 of the preceding embodiment, and the straightening-cutting cycle T4 of the rolled material L is far shorter than T1 and T3. So, the cutting pattern is very smooth, and shortening and acceleration of the cutting pitch can be easily accomplished with very high productivity.

INDUSTRIAL APPLICATION

A method of the invention is applied to cutting cooled products into determined length (product length) in a rolling line of steel products, and especially contributes to improvement of productivity of the steel rolling line and reduction of facility installing spaces, workability by altering a lay-out of the operation in the rolling line.

SUMMARY OF THE INVENTION

The invention relates to a technique of cutting cooled products into product length in a rolling line of steel products, where it is omitted to regulate head parts thereof as having been practised in the prior art, and the products are measured in length and cut into product length in one lot while straightening and/or feeding the products. Straightening and cutting may be smoothly undertaken as keeping balance with a rolling ability.

We claim:

1. A method of processing promptly a sequence of bar pieces severed from an as-rolled steel as it issues from a rolling line, divided into sectioned bars having leading ends and lengths of a cooling hearth, and delivered to and accumulated on the cooling hearth, comprising simultaneously taking out a multiplicity of said steel pieces from said cooling hearth soon after said delivery thereto, forwardly moving said multiplicity to a multi-bar straightening machine, measuring, simultaneously with said straightening, a predetermined distance from the leading ends of said pieces simultaneously, interrupting the forward movement of said pieces after they have advanced by said measured distance, and simultaneously cutting off from the leading ends of said pieces lengths of said measured distance in one lot.

* * * * *